United States Patent [19]

Ohno et al.

[11] 3,779,880

[45] Dec. 18, 1973

[54] PROCESS FOR PREPARING THIETANE DERIVATIVES

[75] Inventors: Atsuyoshi Ohno; Yutaka Ohnishi, both of Sagamihara; Genichi Tsuchihashi, Tokyo, all of Japan

[73] Assignee: Sagami Chemical Research Center, Toyko, Japan

[22] Filed: May 1, 1972

[21] Appl. No.: 249,215

Related U.S. Application Data

[63] Continuation-in-part of Ser. No. 889,746, Dec. 31, 1969, abandoned.

[52] U.S. Cl. .......................... 204/158 R, 204/162 R
[51] Int. Cl. ................................................ B01j 1/10
[58] Field of Search ...................... 204/158 R, 162 R

[56] References Cited
OTHER PUBLICATIONS

Kaiser et al., Journal American Chem. Soc., Vol. 86, (May 5, 1964) pages 1897 & 1898.

Primary Examiner—Howard S. Williams
Attorney—Robert D. Flynn et al.

[57] ABSTRACT

A process for preparing thietane derivatives which comprises reacting a thiocarbonyl compound with olefine by the irradiation of light having a wavelength above 3,000 A. The thiocarbonyl compound used is thiobenzophenone, the olefins used can be acrylonitrile, dichloroethylene, methylacrylate, dicyanoethylene, vinyl acetate, or alkenyl or substituted alkenyl benzene. The obtained thietane derivatives are useful as the starting materials for insecticides and sulfur containing polymers. Novel compounds, i.e., 3-cyano-2,2-diphenyl thietane; cis-3,4-dichloro-2,2-diphenyl thietane; trans-3,4-cichloro-2,2-diphenyl thietane; 3-methoxycarbonyl-2,2-diphenyl thietane; trans-3,4-dicyano-2,2-diphenyl thietane; 3-acetoxy-2,2-diphenyl thietane; 2,2,3-triphenyl-3-methyl thietane; 2,2,3-triphenyl-4-methyl thietane and 2,2,3-triphenyl thietane are given.

4 Claims, No Drawings

PROCESS FOR PREPARING THIETANE DERIVATIVES

RELATED APPLICATION

This application is a continuation-in-part of my application Ser. No. 889,746, filed Dec. 31, 1969 now abandoned.

BACKGROUND OF THE INVENTION

1. Field of the Invention

This invention relates to a process for preparing a thietane or thietane derivatives by the photocycloaddition of a thiocarbonyl compound and an olefin. The compounds of this series are known to be useful in insecticides and, therefore, are valuable industrial chemicals (for example, please refer to U.S. Pat. No. 3,041,350 and U.S. Pat. No. 3,071,594). Further, it is known that the compounds of this series form sulfur-containing polymers by ring-opening polymerization (please refer to Chem. Abstr. 29,1350 (1935)). This invention also provides the above-mentioned novel thietane derivatives.

DESCRIPTION OF THE PRIOR ART

The prior art processes for preparing the compounds of this series are as follows:

1) A process for obtaining a thietane derivative by reacting 1,3-dihalide with sodium sulfide as shown in the following formula:

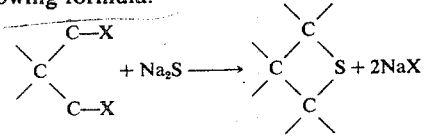

wherein X represents a halogen atom. For example, such process was given in Chem. Abstr. 11 784 (1917) by E. Grishkevich-Trochimovskii.

2) A process for synthesizing a thietane derivative by the cyclization reaction of 3-halomercaptane as shown in the following formula:

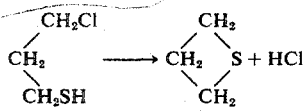

For example, such process was given in J. Chem. Soc., 2665 (1960) by E. P. Adams, K. N. Ayad, E. P. Doyle, D. O. Holland, W. H. Hunter, J. H. C. Nyler and A. Queen.

3) A process employing a reaction of a trimethylene carbonate derivative and potassium thiocyanate as shown by the following formula:

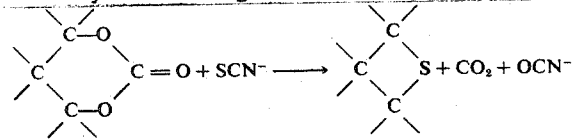

For example, such process was shown in J. Org. Chem., 27 2832 (1962) by S. Searles, H. R. Hays and E. F. Lutz.

When examining the three processes mentioned above, it can be understood that in the processes (1) and (2), the thietane yield is not high, since, with the formation of the desired thietane, a high molecular weight compound having the following formula is always by-produced:

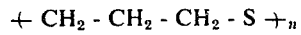

Further, since it is difficult to separate said by-produced high molecular weight substance, it is difficult to obtain thietane of high purity. In process (3), the yield of the desired thietane is, in general, low, and it is difficult to synthesize cyclic carbonate which is one of the starting materials.

BRIEF EXPLANATION OF THE INVENTION

Accordingly, the object of this invention is to provide a novel process for preparing substituted thietanes. The process of this invention is suitable for use as an industrial process.

In accordance with the invention, a thietane derivative having the formula

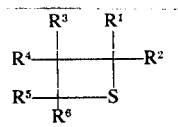

is obtained in a high yield by irradiating a mixture of thioketone having the formula

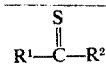

and an olefin having the formula

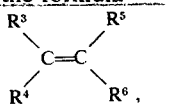

wherein $R^1$, $R^2$, $R^3$, $R^4$, $R^5$ and $R^6$ represent hydrogen or a substituent such as alkyl, aryl, halogen, cyano, alkoxycarbonyl and acetoxy with visible light or ultraviolet light having a wavelength above 3,000 A. In general, with the process of this invention the yield of the thietane product ranges from 80 percent to 90 percent.

DETAILED EXPLANATION OF THE INVENTION

For the light source in this process, a light source having a line spectrum such as sodium lamp, and a light source having a continuous spectrum such as high pressure mercury lamp, thallium lamp, and halogen lamp can be used. The ultra-violet light source can be a medium pressure mercury lamp having a wavelength above 3,000 A. According to the present invention, it is necessary that such light source should be permitted to have a wavelength above 3,000 A. Wavelengths less than 3,000 A are undesirable, because it is impossible to obtain high yields of a desired product. While wavelengths above 6,000 A are not preferable because it is hardly to obtain on a commercial scale.

In general, when the olefin used is a liquid, the reaction can be carried out by using the olefin reactant itself as the reaction solvent. In this case the thioketones to be reacted are dissolved therein and the reaction mixture is irradiated with light emitted from the light source. Said light source can be placed within or outside of the reactor, as long as the light can reach the reactant. If the olefin reactant is solid (for example, trans-1,2-dicyanoethylene), an inert solvent such as cyclohexane is usually employed. The reaction temperature may be within the range 0° - 50°C, but the reaction proceeds in an ambient temperature, in general. In case, the olefin reactant does not dissolve in the solvent at the ambient temperature, while a higher temperature can be used so as to form a homogeneous phase and then irradiation is effected.

The completion of the reaction can be easily confirmed by the disappearance of the violet or red color which characterizes of thioketone. Further, when a highly pure product is desired, purification can be easily carried out by recrystallization or chromatography using an activated alumina or silica gel as an adsorbent.

The characteristic feature of this invention is that the reaction proceeds quite a stereospecific way and usually the thietane obtained is a single compound and contains no isomers. For example, when cis-dichloroethylene is used as the olefin and thiobenzophenone is used as the thioketone, the reaction product is cis-3,4-dichloro-2,2-diphenyl thietane (1) and the trans-isomer thereof (2) is not formed.

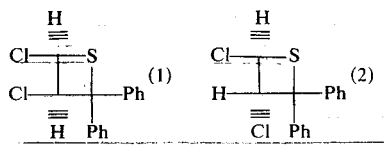

In the photo-addition reaction, if the olefin used has an electron-withdrawing group such as dichloroethylene, acrylonitrile, crotononitrile, acrylates, vinylacetate, fumaronitrile and maleinonitrile, the reaction cannot proceed with the irradiation of a visible light (sodium lamp, thallium lamp, etc.) but thietanes can be obtained in a good yield by irradiation with light having a wavelength of 3,130 A and 3,660 A, while the wavelength of 2,573 A was cut off with the use of a pyrex filter, emitted from a medium pressure mercury lamp.

If the olefin used has an alkyl group or aryl group substituent, such as styrene, α-methylstyrene, and propenylbenzene, thietanes can be obtained in a good yield by the use of sodium lamp or thallium lamp. According to the kind of olefin used, an appropriate light source can be selected so as to improve the yield.

The thioketones usable in the process of this invention include a wide variety of compounds, for example aliphatic thioketones such as thioacetone, alicyclic thioketone such as thiocyclohexanone, aromatic thioketones such as thioacetophenone and thiobenzophenone and thiophosgene.

The olefins usable in the process of this invention include a wide variety of compounds, for example, an olefin having an electron-withdrawing group such as

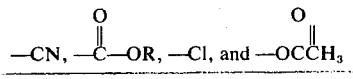

i.e., acrylonitrile, acrylic ester, vinyl acetate, dichloroethylene, crotononitrile, etc. and also olefins having an aryl radical and alkyl radical as substituent, i.e., styrene, α-methyl styrene, propenyl benzene, etc.

The present invention will be further explained in detail by means of Examples. It should be understood that this invention is, however, in no way limited by the Examples, which are given strictly for the purpose of only illustrating some of the essential mode of this invention. All parts given in the Examples are parts by weight, unless otherwise specifically indicated.

EXAMPLE 1

2.4 g of thiobenzohenone was dissolved in 12.3 g of acrylonitrile and then the solution was irradiated with light having the wavelengths of 3,130 A and 3,660 A, while the wavelength of 2,537 A was cut off with the use of a pyrex filter, emitted from a medium pressure mercury lamp at room temperature until the violet color which characterizes the presence of thiobenzophenone disappeared. After the reaction was complete, excess acrylonitrile was distilled off under a reduced pressure, whereby 2.8 g of crystals of crude 3-cyano-2,2-diphenylthietane (3) was obtained. The yield of the product was 79 percent and the melting point was 84.5° C. This is a novel compound.

Elemental analysis: percent by weight
Calculated: C 76.46; H 5.21; N 5.57; S 12.75
Found: C 76.67; H 5.21; N 5.73; S 12.73

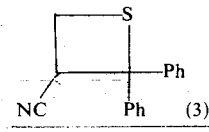

REFERENCE 1

1.2 g of thiobenzophenone was dissolved in 6.5 g of acrylonitrile and then the solution was irradiated with light having the wavelength of 2,537 A emitted from low pressure mercury lamp at room temperature for two days. After the reaction was complete, the excess acrylonitrile was distilled off under a reduced pressure. However, a product corresponding to the thietane (3) showed in Example 1 was not obtained; the actually formed product was 0.6 g of 1,1-diphenyl-2-cyanoethylene.

EXAMPLE 2

2.4 g of thiobenzophenone was dissolved in 20 g of cis-dichloroethylene and then the solution was irradiated with light having the wavelengths of 3,130 A and 3,660 A emitted from a medium pressure mercury lamp as shown in Example 1 at room temperature until the violet color which characterizes the presence of thiobenzophenone disappeared. After the reaction was complete, excess cis-dichloroethylene was distilled off under a reduced pressure, whereby 2.9 g of crystals of crude cis-3,4-dichloro-2,2-diphenyl thietane (1) was obtained. The yield was 82 percent and the melting point was 127° C. This is a novel compound.

Elemental analysis: percent by weight
Calculated: C 61.02; H 4.10; Cl 24.02; S 10.86
Found: C 61.29; H 4.07; Cl 24.16; S 10.77

EXAMPLE 3

2.4 g of thiobenzophenone was dissolved in 20 g of trans-dichloroethylene and then the solution was irradiated with light having the wavelengths of 3,130 A and 3,660 A emitted from a medium pressure mercury lamp as shown in Example 1 at room temperature until the violet color which characterizes the existence of thiobenzophenone disappeared. After the reaction was complete, excess trans-dichloroethylene was distilled off under a reduced pressure, and crystals of crude trans-3,4-dichloro-2,2-diphenyl thietane (2) were obtained with a yield of 90 percent. The melting point was 72° – 73° C. This is a novel compound.

Elemental analysis: percent by weight
Calculated: C 61.02; H 4.10; Cl 24.02; S 10.86
Found: C 60.96; H 4.04; Cl 23.91; S 10.86

EXAMPLE 4

2.0 g of thiobenzophenone was dissolved in 15 g of methyl acrylate and then the solution was irradiated with light having the wavelengths of 3,130 and 3,660 A emitted from a medium pressure mercury lamp as shown in Example 1 at room temperature until the violet color which characterizes the existence of thiobenzophenone disappeared. After the reaction was complete, the excess olefin was distilled off under a reduced pressure. Thereby 2.3 g of crystals of crude 3-methoxycarbonyl-2,2-diphenyl thiethane (4) was obtained. The yield was 75 percent and the melting point was 85° C. This is a novel compound. NMR, mass spectrum and IR spectrum gave satisfactory results.

Elemental analysis: percent by weight
Calculated: C 71.80; H 5.67
Found: C 71.66; H 5.64

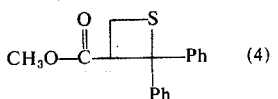

EXAMPLE 5

3.0 g of thiobenzophenone and 1.17 g of trans-dicyanoethylene were dissolved in 15 ml of tetrahydrofuran and then the solution was irradiated with light having the wavelengths of 3,130 A and 3,660 A emitted from a medium pressure mercury lamp as shown in Example 1 at room temperature until the characteristic color of thiobenzophenone disappeared. After the reaction was complete, the excess tetrahydrofuran was distilled off under a reduced pressure and an oily material was obtained. The oily material was purified by chromatography by using Florisil (Trade Name, supplied by Floridin Co. Florida) as an adsorbent and benzene as an eluting agent. By the purification, 1.5 g of trans-3,4-dicyano-2,2-diphenyl thietane (5) was obtained. The yield was 36 percent and the melting point of the product was 145.5° C. This is a novel compound.

Elemental analysis: percent by weight
Calculated: C 73.88; H 4.38; S 11.59; N 10.14
Found: C 73.84; H 4.60; S 11.66; N 10.25

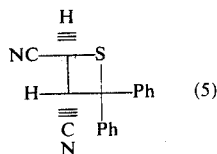

EXAMPLE 6

4.3 g of thiobenzophenone was dissolved in 20 g of vinyl acetate and then the solution was irradiated with light having the wavelengths of 3,130 A and 3,660 A emitted from a medium pressure mercury lamp as shown in Example 1 until the characteristic color of thiobenzophenone disappeared. After the reaction was complete, the excess olefin was distilled off. Whereby an oily material was obtained. The oily material was purified by chromatography by using Florisil as the adsorbent and petroleum ether as the eluting agent. After purification, 3.0 g of 3-acetoxy-2,2-diphenyl thietane (6) was obtained. The yield was 50 percent and the melting point was 115.5° C. This is a novel compound. NMR, mass spectrum and IR spectrum gave satisfactory results.

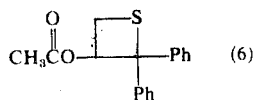

EXAMPLE 7

4.0 g of thiobenzophenone was dissolved in 20 g of α-methylstyrene and then the solution was subjected to irradiation with light having the wavelength of 5,890 A emitted from a sodium lamp at room temperature until the characteristic color of thiobenzophenone disappeared. After the reaction was complete, the excess α-methylstyrene was distilled off under a reduced pressure, crystals of crude 2,2,3-triphenyl-3-methyl thietane (7) was obtained in a yield of 90 percent. The melting point of the product was 113° C. This is a novel compound.

Elemental analysis: percent by weight
Calculated: C 83.50; H 6.37; S 10.13
Found: C 83.72; H 6.38; S 10.20

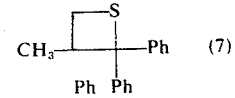

EXAMPLE 8

4.0 g of thiobenzophenone was dissolved in 20 g of trans-propenylbenzene and then the solution was subjected to irradiation with the visible light having the wavelengths of 4,000 A – 6,000 A emitted from a halogen lamp until the characteristic color of thiobenzophenone completely disappeared. After the reaction was complete, the excess olefin was removed, whereby crystals of crude trans-2,2,3-triphenyl-4-methyl thietane (8) was obtained. The yield was 63 percent. This is a novel compound.

Elemental analysis: percent by weight
Calculated: C 83.50; H 6.37; S 10.13
Found: C 83.84; H 6.73; S 10.30

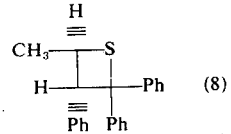

EXAMPLE 9

1.0 g of thiobenzophenone was dissolved in a mixture of 3.0 g of styrene and 9.0 g of cyclohexane and then the solution was subjected to irradiation with a light having the wavelength of 5,890 A emitted from a sodium lamp at room temperature until the characteristic color of thiobenzophenone completely disappeared. After the reaction was complete, the low boiling materials were distilled off under a reduced pressure. The residue was purified by column chromatography by using Florisil as the adsorbent and petroleum ether as the eluting medium. After purification, 2,2,3-triphenyl thietane (9) was obtained. The yield was 80 percent and its melting point was 140° C. This is a novel compound. NMR, mass spectrum and IR spectrum gave satisfactory results.

Elemental analysis: percent by weight
Calculated: C 83.40; H 6.00; S 10.60
Found: C 83.45; H 6.23; S 10.59

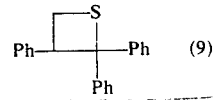

REFERENCE 2

When 2,2,3-triphenyl thietane (9) which was obtained in the Example 9 was irradiated with light having the wavelength of 2,537 A emitted from low pressure mercury lamp for 20 hrs, the compound (9) was decomposed. From the reaction products, 1,1,2-triphenylethylene was obtained in 11 percent yield.

REFERENCE 3 cis-2-Butene and nitrogen were bubbled continuously through a solution of thiobenzophenone (2.2 g) in cyclohexane (170 ml) which was irradiated with light having the wavelength of 2,537 A emitted from low pressure mercury lamp. After 4 hrs. the thioketone was completely reacted, as evidenced by the disappearance of its blue color. The solvent and excess cis-2-butene were removed under reduced pressure, and the residue was distilled at 0.5 mmHg giving a light blue-tinged liquid. Whereby 0.7 g of crystals of crude 1,1-diphenyl-1-propene was obtained.

What is claimed is:

1. A process for preparing a thietane having the following formula

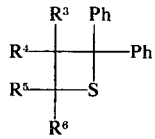

by reacting thiobenzophenone with an olefin having the following formula

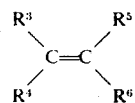

under the irradiation of light having a wavelength above 3,000 A, wherein $R^3$, $R^4$, $R^5$ and $R^6$ represent hydrogen or a substituent selected from the group consisting of alkyl, aryl, halogen, cyano, alkoxycarbonyl, and acetoxy radicals, and Ph represents a phenyl radical, and recovering said thietane from the resulting reaction product.

2. A process of claim 1, wherein the reaction temperature is within the range of from 0° to 50° C.

3. A process of claim 1, wherein the wavelength is from above 3,000 A to 6,000 A.

4. A process of claim 1, wherein the olefin reactant per se is used as the reaction solvent.

* * * * *